Patented Feb. 21, 1950

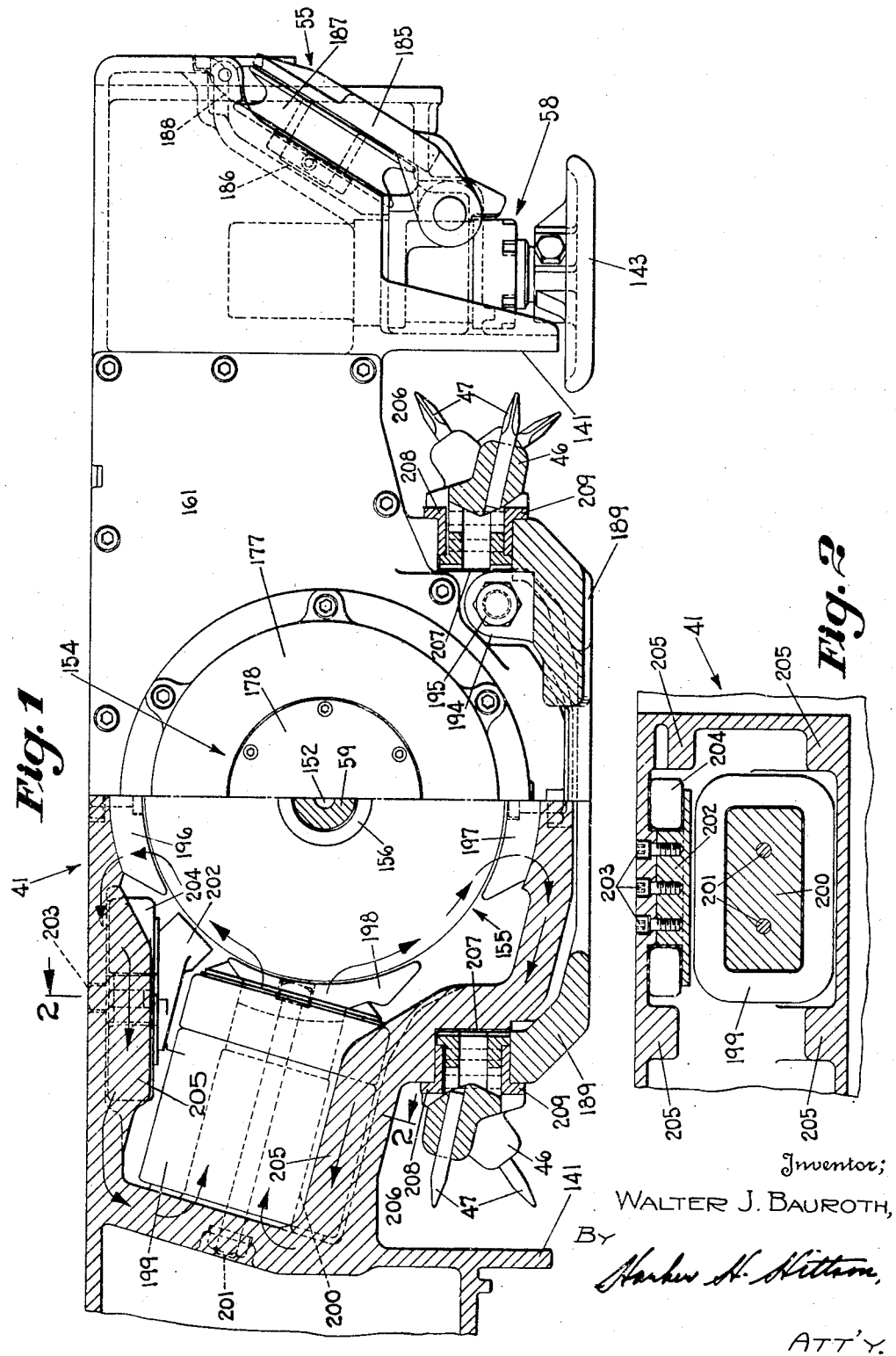

2,498,389

UNITED STATES PATENT OFFICE 2,498,389

ELECTRIC MOTOR FRAME CONSTRUCTION

Walter J. Bauroth, Columbus, Ohio, assignor to The Jeffrey Manufacturing Company, a corporation of Ohio Application September 11, 1947, Serial No. 773,336

6 Claims. (Cl. 171—252)

This invention relates to an electric motor and particularly to improved construction of the frame of an electric motor which has one or more relatively thin walls to provide a minimum dimension, in which supplemental magnetic flux carrying ribs or paths are provided to supplement the thin walls which are of magnetic material and provide a flux path, to the end that the magnetic path of the flux will not be saturated.

Other objects of the invention will appear hereinafter, the novel features and combinations being set forth in the appended claims.

In the accompanying drawings,

Fig. 1 is a combination elevational and sectional view of a mining machine which incorporates an electric motor having the features of my invention; and Fig. 2 is a sectional view taken on the line 2—2 of Fig. 1, looking in the direction of the arrows.

The mining machine which is illustrated in part in the drawings is disclosed in full detail and claimed in the application of Arthur L. Lee, Serial No. 586,979, filed April 6, 1945. Certain features herein disclosed are claimed in said Lee application or one or more divisions thereof. This includes all novel features not herein claimed, including the general structure of the motor, ignoring the ribs which provide greater magnetic area, with the inclined lateral poles, and the frame structure providing the paths for the cutter chain, among other features.

One of the problems which is constantly encountered in mining machinery, of which the so-called "Shortwall" mining machine is an extreme illustration, is that of providing a minimum dimension, such as a minimum height, to the end that the machine may be used in very low coal vein seams. The problem which this invention solves was created by producing a very low height mining machine, as disclosed in the Lee application above identified.

The motor 154 disclosed includes a frame 41 of magnetic material, such as iron, which is the frame not only of the mining machine but also of the electric motor thereof, said electric motor 154 including an armature or rotor 155 which is mounted upon a hollow tube or shaft 156 coupled to a drive shaft through a clutch, not illustrated, having a lubricating bore 152 therethrough. The armature 155 is provided with the usual armature windings and commutator and the body of it is of laminated iron or steel, providing indicated paths for the magnetic flux which is developed by the field structure and which flows through the main frame 41. On the front of the main frame 41 is a removable plate 161 which in turn carries a clutch casing 177 having at its center a removable bearing plate 178.

Adjacent the bottom of the main frame 41 there is a pair of laterally spaced arms 189 which cooperate to form a groove 207 along each side of the main frame adjacent a lateral passageway 206 for an endless cutter chain 46 having fanned bits 47 which pass through the passageways 206 as the cutter chain 46 is driven by the electric motor 154, hereinafter described in detail, to cut a kerf in a manner disclosed in detail in the Lee application above identified. The outer perimeter of each passageway 206 is defined by a rib 141 forming an integral part of the main frame 41.

In Fig. 1 of the drawings there are also shown some incidental features of the mining machine which are disclosed and claimed in the Lee application above identified, including a leveling piston motor or jack 58 having a foot pad 143 and including a sheave assembly 55 which includes a pivoted sheave plate or bracket 185 provided with a central pin or post 186 and carrying a sheave 187, the assembly being releasably latched by a latch 188.

Other incidentally disclosed features include a screw 195 cooperating with an ear 194, there being one for each arm 189 by which it is attached to the main frame 41. Also there are removable guides or wear strips 208 and 209 adjacent the grooves 207.

Referring more particularly to other features of the electric motor which are significant parts of the instant application, the main frame 41 is provided with a pair of similarly located main poles on opposite sides of the longitudinal axis thereof, one of which is seen at 200 and upon which there is an energizing winding 199. The pole 200 is provided with a pole shoe 198 which is located adjacent the periphery of the armature 155. Pole shoe 198 and pole 200 are removably attached to the main frame 41 by one or more through bolts 201.

The electric motor 154 illustrated is of the consequent pole type which is a feature contributing toward its low overall height, the consequent poles being located at the top and bottom of the motor, with the main or salient poles extending laterally or to the sides. Two consequent poles are seen in Fig. 1 of the drawings, being provided respectively with pole shoes 196 and 197 removably attached to the main frame 41. A compensating interpole 202 is likewise attached to the main frame 41 by screws 203 and is provided with a compensating coil or winding 204, the pole face projecting in a position adjacent the armature 155.

By reference to Figs. 1 and 2 of the drawings it will be seen that there are two walls of the main frame, casing or housing 41 of the electric motor and mining machine which have a restricted dimension. In other words, they should be as thin as possible. For example, the top wall of said main frame 41 is made quite thin. Likewise the wall which forms the top of the passageway 206 is made quite thin. For structural purposes it is entirely permissible to make the top and bottom walls, as seen in Fig. 2 of the drawings, with a dimension not greater than the minimum dimension there shown. While this is entirely adequate for structural purposes it is inadequate for magnetic purposes, since the paths for the magnetic flux induced by the energizing winding 199 will pass through branches, one of which is through the lower wall, as viewed in Fig. 2, and the other through the upper wall, as there viewed, passing through the iron of the main frame 41 and through the consequent poles 196, 197 and the iron of the armature 155, as illustrated by the arrows in Fig. 1 of the drawings.

In order to make up for what otherwise would be a deficiency in cross-sectional area of the magnetic path for the flux developed by the winding 199 and thus to prevent saturation of the iron of said magnetic path with a consequent lowering of the energy which the motor could develop, I have provided means to build up the cross-sectional area of the magnetic path adjacent the otherwise deficient thin wall areas of the motor, by providing supplemental flux carrying ribs or projections 205 which are formed as integral parts of the main frame 41. These ribs or projections extend along the adjacent wall surface and are integrally formed therewith. Furthermore, they project inwardly of the casing or main frame walls in areas which are otherwise unused, thus not interfering with any normal mechanism and not in any way increasing a vital dimension of the motor or mining machine.

As illustrated, the ribs or projections 205 are adjacent and substantially parallel with the coil 199, there being a rib on each side thereof, particularly adjacent the thin wall which forms the top of the passageway 206. Likewise, adjacent the top wall of the main frame 41, the main portion of which is thin, there are ribs 205 which also extend laterally on opposite sides of the interpole coil or winding 204 which is also somewhat in a position adjacent and above the main or salient pole 200 and substantially parallel therewith. It is to be noted that the top wall of casing 41 and the lower wall which forms the top of passageway 206 cooperate to shroud the pole 200 and its winding 199. The added cross-sectional area at the critical positions in the magnetic path provided by the main frame 41 produced by the ribs or projections 205 is sufficient to prevent saturation of the iron or magnetic material at any position in its path. Stated in broader terms, the pole 200 and winding 199 are positioned between two thin opposite walls, forming part of the magnetic path of said pole, the outer surfaces of which walls are desirably spaced apart a limited or restricted distance along one dimensional axis perpendicular to the longitudinal axis of said pole. Said limited dimensional axis is also at right angles to at least one of said thin walls. To compensate magnetically for the thinness of said opposite walls, ribs 205 are provided inside said walls and laterally of said coil 199 and pole 200 relative to said restricted dimensional axis. Said ribs 205 project inwardly or at right angles to the plane of the attached thin wall.

As a consequence of the above provision it is possible to construct a mining machine in which the main portion of the main frame housing, which carries the magnetic flux, has a cross-sectional area below that required to carry the flux without saturation, the flux saturation being prevented by the building up of said cross-sectional area at its normally deficient places by flux conducting ribs or projections.

Obviously those skilled in the art may make various changes in the details and arrangement of parts without departing from the spirit and scope of the invention as defined by the claims hereto appended, and I therefore wish not to be restricted to the precise construction herein disclosed.

Having thus shown an embodiment of my invention, what I desire to secure by Letters Patent of the United States is:

1. An electric motor including a main frame, a field pole magnetically connected to said main frame, an energizing winding for said field pole, an armature adjacent said field pole, said armature, field pole and main frame all containing magnetic material and providing a path for magnetic flux induced by said energizing winding, said main frame having walls on opposite sides of said pole and winding, each having a relatively small cross-sectional area adjacent and substantially parallel said field coil on opposite sides thereof to provide a restricted dimension along one axis perpendicular to the axis of said pole which area is inadequate to carry the magnetic flux developed by said winding without tending to saturate it magnetically, and means including projecting ribs of magnetic material inside said opposite walls and laterally of said poles and windings relative to said restricted dimension axis added to said frame at said area of relatively small cross-sectional area and substantially parallel with said energizing winding to provide adequate total cross-sectional area of magnetic material in said flux path to prevent said tendency to saturate.

2. An electric motor including a main frame, a field pole magnetically connected to said main frame, an energizing winding for said field pole, an armature adjacent said field pole, said armature, field pole and main frame all containing magnetic material and providing a path for magnetic flux induced by said energizing winding, said main frame having a wall of relatively small cross-sectional dimension perpendicular to a restricted dimensional axis producing a cross-sectional area is inadequate to carry the magnetic flux developed by said winding without tending to saturate it magnetically, and means including a projecting rib of magnetic material added to said frame at said area of relatively small cross-sectional area and projecting inwardly from said wall and located laterally of said pole, to provide adequate total cross-sectional area of magnetic material in said flux path to prevent said tendency to saturate.

3. An electric motor including an enclosing main frame housing having a thin wall to produce a low dimension of said frame, a rotor in said frame, a magnetic field pole attached to said frame and having a face adjacent said rotor, an energizing winding for said pole, said thin wall of said main frame, said pole and said rotor being of magnetic material and providing a path for magnetic flux induced by said energizing winding, and means including a rib of magnetic material formed adjacent said thin wall and integral therewith along one side and laterally of said pole and projecting at right angles to the plane of said thin wall and operative to increase the effective cross-sectional area of the magnetic path adjacent said thin wall.

4. A mining machine including an electric motor having a minimum height, said motor including an enclosing main frame housing having a thin top wall to produce a low dimension of said frame, a rotor in said frame, a magnetic field pole attached to said frame and extending laterally inwardly from said frame and having a face adjacent said rotor, an energizing winding for said pole, a thin wall of said main frame below said winding providing the top of a cutter chain passageway in said main frame housing, said top and lower thin walls shrouding said pole and its energizing winding, said thin walls of said main frame, said pole and said rotor being of magnetic material and providing a path for magnetic flux induced by said energizing winding, and ribs of magnetic material formed adjacent said thin walls and integral therewith along one side and along the sides of said winding and extending inside said thin walls and laterally of said pole and winding relative to an axis designating the thin wall dimensions of magnetic material on opposite sides of said pole, said ribs being operative to increase the effective cross-sectional area of the magnetic path adjacent said thin walls.

5. A low height mining machine including a main frame, an electric motor in said frame including a rotor, inwardly and laterally extending poles attached at opposite sides of said main frame and having faces adjacent said rotor, said main frame cooperating with said poles and rotor to provide a magnetic path, said main frame having top and bottom walls adjacent said poles and cooperating with said frame to shroud said poles and being thin and of low cross-sectional area which is inadequate to carry the desired flux without saturation, the bottom walls below said poles cooperating with other frame parts to provide a path for a cutter chain the opposite runs of which are above the bottom extremity of said main frame, and ribs of magnetic material carried on and inwardly of said top and bottom thin walls adjacent and substantially parallel with said poles and laterally of the poles and windings along the thin wall axis to increase the effective cross-sectional area of the magnetic path adjacent said thin walls.

6. A low height mining machine including a main frame, an electric motor in said frame including a rotor, inwardly and laterally extending poles attached at opposite sides of said main frame and having faces adjacent said rotor, said main frame cooperating with said poles and rotor to provide a magnetic path, said main frame having bottom walls adjacent said poles and cooperating with said frame to shroud said poles and being thin and of low cross-sectional area which is inadequate to carry the desired flux without saturation, the bottom walls below said poles cooperating with other frame parts to provide a path for a cutter chain the opposite runs of which are above the bottom extremity of said main frame, and ribs of magnetic material carried on said bottom thin walls and inwardly of said frame and adjacent and substantially parallel with said poles and laterally of the poles and magnetic windings along the thin wall axis to increase the effective cross-sectional area of the magnetic path adjacent said thin walls.

WALTER J. BAUROTH.

REFERENCES CITED

The following references are of record in the file of this patent:

UNITED STATES PATENTS

| Number | Name | Date |
|---|---|---|
| 839,502 | Meyrs | Dec. 25, 1906 |
| 910,892 | Bary | Jan. 26, 1909 |
| 1,404,306 | Levin | Jan. 24, 1922 |
| 2,075,870 | Sloane | Apr. 6, 1937 |

OTHER REFERENCES

Die Gleichstrom Machine, Arnold, vol. II, page 119, Springer, Berlin, 1907.